United States Patent
Schoenblum

(10) Patent No.: US 8,285,068 B2
(45) Date of Patent: Oct. 9, 2012

(54) COMBINED DEBLOCKING AND DENOISING FILTER

(75) Inventor: Joel Warren Schoenblum, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 1113 days.

(21) Appl. No.: 12/146,369

(22) Filed: Jun. 25, 2008

(65) Prior Publication Data
US 2009/0327386 A1    Dec. 31, 2009

(51) Int. Cl.
*G06K 9/40*    (2006.01)

(52) U.S. Cl. ........ 382/260; 382/232; 382/254; 382/210; 708/300; 708/400

(58) Field of Classification Search ................... 382/232, 382/254, 260, 210; 708/300, 400; 359/885, 359/890, 891; 455/213
See application file for complete search history.

(56) References Cited

U.S. PATENT DOCUMENTS

| | | | |
|---|---|---|---|
| 4,442,454 A | 4/1984 | Powell | |
| 4,698,672 A | 10/1987 | Chen et al. | |
| 5,764,805 A | 6/1998 | Martucci et al. | |
| 6,442,203 B1 | 8/2002 | Demos | |
| 6,735,342 B2 | 5/2004 | Felts et al. | |
| 6,754,234 B1 | 6/2004 | Wiesner et al. | |
| 6,801,573 B2 | 10/2004 | Zheng | |
| 7,206,459 B2 | 4/2007 | Berkner et al. | 382/251 |
| 8,130,828 B2 * | 3/2012 | Hsu et al. | 375/240.03 |
| 2002/0196857 A1 | 12/2002 | Kono et al. | |
| 2003/0086623 A1 * | 5/2003 | Berkner et al. | 382/260 |
| 2003/0128761 A1 | 7/2003 | Zhou | |
| 2005/0078872 A1 | 4/2005 | Samadani et al. | 382/233 |
| 2005/0094893 A1 | 5/2005 | Samadani | 382/275 |
| 2005/0100235 A1 | 5/2005 | Kong et al. | 382/261 |
| 2005/0100236 A1 | 5/2005 | Kong et al. | 382/261 |
| 2005/0100237 A1 | 5/2005 | Kong et al. | 382/261 |
| 2005/0100241 A1 | 5/2005 | Kong et al. | 382/268 |
| 2006/0039624 A1 | 2/2006 | Kong et al. | 382/274 |
| 2006/0056724 A1 | 3/2006 | Le Dinh et al. | |
| 2006/0133682 A1 * | 6/2006 | Tu et al. | 382/248 |
| 2006/0245497 A1 | 11/2006 | Tourapis et al. | |
| 2007/0041448 A1 | 2/2007 | Miller et al. | 375/240.18 |

(Continued)

FOREIGN PATENT DOCUMENTS

EP    0 762 738 A2    3/1997

(Continued)

OTHER PUBLICATIONS

International Search Report dated Aug. 24, 2010 cited in Application No. PCT/US2010/037189.

(Continued)

*Primary Examiner* — Ali Bayat
(74) *Attorney, Agent, or Firm* — Merchant & Gould

(57) ABSTRACT

An apparatus, a computer readable medium to instruct a process to implement a method, and a method of reducing blocking artifacts and/or noise in an image that has been compressed by a block-based encoding process. The method includes deblocking the image using overlapped forward directional transforms, the overlapped forward directional transforms including directional selecting to filter across horizontal and vertical boundaries, denoising the image, in one version edge detecting to classify individual pixels as to whether or not they belong to edge features, and generating output pixels by locally adapting to whether the pixels are in block boundaries, and/or include edge features.

26 Claims, 5 Drawing Sheets

U.S. PATENT DOCUMENTS

| | | |
|---|---|---|
| 2007/0071095 A1 | 3/2007 | Lim |
| 2007/0140352 A1 | 6/2007 | Bhaskaran et al. |
| 2008/0055477 A1 | 3/2008 | Wu et al. |
| 2008/0123740 A1 | 5/2008 | Ye |
| 2008/0211965 A1 | 9/2008 | Lippman |
| 2008/0253457 A1 | 10/2008 | Moore |
| 2009/0002553 A1 | 1/2009 | Living |
| 2009/0016442 A1* | 1/2009 | Shankar et al. .......... 375/240.24 |
| 2009/0067504 A1 | 3/2009 | Zheludkov et al. |
| 2009/0238535 A1 | 9/2009 | Robertson et al. |
| 2010/0020880 A1 | 1/2010 | Susnow et al. |
| 2010/0033633 A1 | 2/2010 | Dane et al. |
| 2010/0091862 A1 | 4/2010 | Kuo et al. |
| 2010/0265344 A1 | 10/2010 | Velarde et al. |
| 2010/0309377 A1 | 12/2010 | Schoenblum et al. |
| 2010/0309379 A1 | 12/2010 | Schoenblum et al. |
| 2010/0309979 A1 | 12/2010 | Schoenblum et al. |
| 2010/0309989 A1 | 12/2010 | Schoenblum et al. |
| 2010/0309990 A1 | 12/2010 | Schoenblum et al. |
| 2010/0309991 A1 | 12/2010 | Schoenblum et al. |
| 2010/0316129 A1 | 12/2010 | Zhao et al. |

FOREIGN PATENT DOCUMENTS

| | | |
|---|---|---|
| WO | WO 91/08547 | 6/1991 |

OTHER PUBLICATIONS

Kostadin Dabov et al., "Video Denoising by Sparse 3D Transform-Domain Collaborative Filtering," Proc. Of the 15$^{th}$ European Signal Processing Conference, Poland, Sep. 3-7, 2006, 5 pgs.

Julian Magarey et al., "Robust Motion Estimation Using Chrominance Information in Colour Image Sequences," Lecture Notes in Computer Science, vol. 1310/97, Dec. 31, 1997, 9 pgs.

Aleksandra Pizurica et al., "Noise Reduction in Video Sequences Using Wavelet-Domain and Temporal Filtering," Proceedings of SPIE, vol. 5266, Feb. 27, 2004, 13 pgs.

T. Kasezawa: "Blocking artifacts reduction using discrete cosine transform," in *IEEE Transactions on Consumer Electronics*, pp. 48-55, New York: Institute of Electrical and Electronics Engineers, vol. 43, No. 1, Feb. 1997.

Y. Nie, H. Kong, A. Vetro, H. Sun, and K. Barner: "Fast adaptive fuzzy post-filtering for coding artifacts removal in interlaced video," in *IEEE International Conference on Acoustics, Speech, and Signal Processing*, pp. ii/993-ii/996, New York: Institute of Electrical and Electronics Engineers, vol. 2, Mar. 2005.

A. Nosratinia: "Denoising JPEG images by re-application of JPEG," in *1998 IEEE Second Workshop on Multimedia Signal Processing*, pp. 611-615, New York: Institute of Electrical and Electronics Engineers, Dec. 1998.

R. Samadani, A. Sundararajan, and A. Said: "Deringing and deblocking DCT compression artifacts with efficient shifted transforms," in *2004 International Conference on Image Processing*. pp. 1799-1802, Piscataway, New Jersey: Institute of Electrical and Electronics Engineers, vol. 3, No. Oct. 2004.

G.A. Triantafyllidis, D. Tzovaras, and M.G. Strintzis: "Blocking artifact detection and reduction in compressed data," in *IEEE Transactions on Circuits and Systems for Video Technology*, pp. 877-890, New York: Institute of Electrical and Electronics Engineers, vol. 12, No. 10 Oct. 2002.

D. Rusanovskyy and K. Egiazarian: "Video Denoising Algorithm in Sliding 3D DCT Domain," in *Advanced Concepts for Intelligent Vision Systems*, pp. 618-625, Berlin/Heidelberg: Springer, Lecture Notes in Computer Science, vol. 3708, 2005.

C. Wu, B. Liu, and J. Yang: "Adaptive postprocessors with DCT-based block classifications," in *IEEE Transactions on Circuits and Systems for Video Technology*, pp. 365-375, New York: Institute of Electrical and Electronics Engineers, vol. 13, No. 5, May 2003.

J.F. Canny: "A computational approach to edge detection," in *IEEE Trans Pattern Analysis and Machine Intelligence*, pp. 679-698, Washington D.C.: IEEE Computer Society, vol. 8, No. 6, Nov. 1986.

International Search Report dated Dec. 4, 2009 cited in Application No. PCT/US2009/048422.

Pier Luigi Dragotti et al., "Discrete directional wavelet bases for image compression," Visual Communications and Image Processing, Jul. 2003, Proceedings of SPIE vol. 5150, pp. 1287-1295.

Ramin Samadani et al., "Deringing and Deblocking DCT Compression Artifacts with Efficient Shifted Transforms," 2004 International Conference on Image Processing (ICIP), Oct. 2004, vol. 3, pp. 1799-1802.

Dmytro Rusanovskyy et al., "Video Denoising Algorithm in Sliding 3D DCT Domain," Advanced Concepts for Intelligent Vision Systems Lecture Notes in Computer Science, vol. 37808, Jan. 2005, pp. 618-625.

Wen-Chuang Huang et al., "Predictive subband image coding with wavelet transform," Signal Processing: Image Communication, vol. 13, No. 3, Sep. 1998, pp. 171-181.

Copending U.S. Appl. No. 12/479,018, filed Jun. 5, 2009 entitled "Out of Loop Frame Matching in 3D-Based Video Denoising".

Copending U.S. Appl. No. 12/479,065, filed Jun. 5, 2009 entitled "Consolidating Prior Temporally-Matched Frames in 3D-Based Video Denoising".

Copending U.S. Appl. No. 12/479,104, filed Jun. 5, 2009 entitled "Efficient Spatial and Temporal Transform-Based Video Preprocessing".

Copending U.S. Appl. No. 12/479,147, filed Jun. 5, 2009 entitled "Estimation of Temporal Depth of 3D Overlapped Transforms in Video Denoising".

Copending U.S. Appl. No. 12/479,194, filed Jun. 5, 2009 entitled "Adaptive Thresholding of 3D Transform Coefficients for Video Denoising".

Copending U.S. Appl. No. 12/479,244, filed Jun. 5, 2009 entitled "Motion Estimation for Noisy Frames Based on Block Matching of Filtered Blocks".

Copending U.S. Appl. No. 12/479,941, filed Jun. 5, 2009 entitled "Preprocessing of Interlaced Video with Overlapped 3D Transforms".

Copending U.S. Appl. No. 12/479,970, filed Jun. 5, 2009 entitled "Scene Change Detection and Handling for Preprocessing Video with Overlapped 3D Transforms".

Copending U.S. Appl. No. 12/479,987, filed Jun. 5, 2009 entitled "Staggered Motion Compensation for Preprocessing Video with Overlapped 3D Transforms".

Kostadin Dabov et al., "Image denoising by sparse 3D transform-domain collaborative filtering", Aug. 2007, vol. 16, No. 8, pp. 1-16.

Kostadin Dabove et al., "Color image denoising via sparse 3D collaborative filtering with grouping constraint in luminance-chrominance space", Jul. 2007, pp. I-313 to I-316.

Kostadin Dabove et al., "Video denoising by sparse 3D transform-domain collaborative filtering", Sep. 2007, European Signal Processing Conference, Poznan, Poland, 5 pgs.

Dmytro Rusanovskyy et al., "Moving-window varying size 3D transform-based video denoising", VPQM'06, Scottdale, USA 2006, pp. 1-4.

Steve Gordon et al., "Simplified Use of 8x8 Transforms-Updated Proposal & Results", Joint Video Team (JVT) of ISO/IEC MPEG & ITU-T VCEG (ISO/IEC JTC1/SC29/WG11 and ITU-T SG16 Q.6, Mar. 2004, Munich, Germany, pp. 1-17.

U.S. Office Action dated Oct. 11, 2011 cited in U.S. Appl. No. 12/479,018, 17 pgs.

European Office Action dated Nov. 15, 2011 cited in Application No. 09 770 924.0, 4 pgs.

U.S. Office Action dated Oct. 12, 2011 cited in U.S. Appl. No. 12/479,147, 19 pgs.

U.S. Office Action dated Oct. 20, 2011 cited in U.S. Appl. No. 12/479,194, 19 pgs.

U.S. Office Action dated Nov. 23, 2011 cited in U.S. Appl. No. 12/479,244, 22 pgs.

Marpe et al., "H.264/MPEG4-AVC Fidelity Range Extensions: Tools, Profiles, Performance, and Application Areas," IEEE Conference on Image Processing, Nov. 14, 2005, 4 pgs.

U.S. Office Action dated Jun. 4, 2012 cited in U.S. Appl. No. 12/479,104, 29 pgs.

U.S. Final Office Action dated Jul. 3, 2012 cited in U.S. Appl. No. 12/479,018, 19 pgs.

U.S. Office Action dated Jul. 17, 2012 cited in U.S. Appl. No. 12/479,147, 13 pgs.

U.S. Office Action dated Aug. 6, 2012 cited in U.S. Appl. No. 12/479,065, 18 pgs.

U.S. Final Office Action dated Aug. 7, 2012 cited in U.S. Appl. No. 12/479,244, 20 pgs.

U.S. Office Action dated Aug. 10, 2012 cited in U.S. Appl. No. 12/479,194, 17 pgs.

* cited by examiner

COMBINED DEBLOCKING AND DENOISING FILTER

FIELD OF THE INVENTION

The present disclosure relates generally to filtering image and video data.

BACKGROUND

Deblocking filters are known to filter decoded video that has been coded by a block-based coding method such as MPEG-2 and other methods. MPEG-2 coding, for example includes coding in 8×8 pixel blocks and 16×16 pixel macroblocks. Blocking artifacts include the boundaries between the blocks and/or between macroblocks to be visible when playing decoded video. Deblocking filters filter decoded video at the pixel level to remove blocking artifacts prior to playback, and many such filters are known.

Other pixel-level video filtering also is known. For example, it is known to filter video at the pixel level prior to encoding to remove noise, so that, for example, the bit rate of the coded video can be lower than without the noise filtering.

DESCRIPTION OF EXAMPLE EMBODIMENTS

Overview

Figure 1:
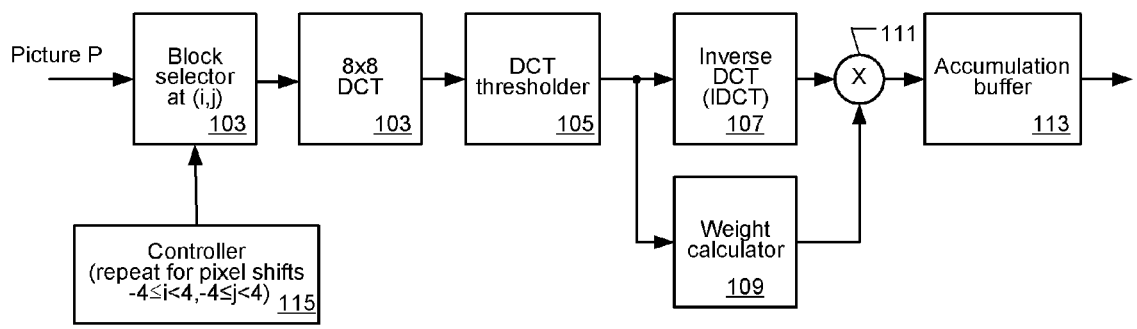
FIG. 1 shows a simple block diagram of a sliding window DCT filter.

Described herein are a method, an apparatus, and a medium configured with instructions that when executed carry out the method. The method takes an image and carried out deblocking and denoising.

Particular embodiments include a method of reducing blocking artifacts and/or noise in an image that has been compressed by a block-based encoding process. The method includes deblocking an image using overlapped forward directional transforms. The overlapped forward directional transforms include directional thresholding to filter across horizontal and vertical boundaries. The method further includes denoising using overlapped forward non-directional transforms, with the overlapped forward non-directional transforms including non-directional thresholding. The method also includes edge detecting to classify individual pixels as to whether or not they belong to edge features, and generating output pixels by locally adapting to whether the pixels are in block boundaries, and/or include edge features. The edge detecting uses the overlapped forward transforms.

Particular embodiments include a method of reducing blocking artifacts and/or noise in an image that has been compressed by a block-based encoding process. The method includes for a block of image data, repeating for different horizontal and vertical shifts (including no shifts) selecting a block of image data according to the shift, and directionally forward transforming the block by a forward horizontally selecting transform and by a forward vertically selecting transform. The forward horizontally selecting transform is separable to a one-dimensional horizontal forward transform followed by a directional selection operation, e.g., thresholding to select significant ones of the one-dimensionally transformed values, followed by a one-dimensional vertical forward transform. Similarly, the forward vertically selecting transform is separable to a one-dimensional vertical forward transform followed by a directional selection operation, e.g., thresholding to select significant ones of the one-dimensionally transformed values, followed by a one-dimensional horizontal forward transform. The method further includes inverse transforming the horizontally selected transformed data and the vertically selected transformed data, and forming a combination of the inverse transformed horizontally selected transformed data and the inverse transformed vertically selected transformed data for the different shifts. The method further includes filtering the block of image data to form a block of denoised image data; and, for each pixel location in the block of image data, combining the formed combination data and the denoised image data according to one or more criteria.

In one version, the filtering the block of image data to form a block of denoised image data includes for each location of the block of image data, repeating for different horizontal and vertical shifts, including no shift, forward transforming the block by a forward non-directional selective transform to form non-directionally selected transformed data, wherein the non-directional selective transform includes a non-directional selection operation, e.g., thresholding to select significant ones of the two-dimensionally transformed values. That version further includes inverse transforming the non-directionally selected transformed data, determining a weight factor for the non-directionally selected transformed data, and forming a weighted combination of inverse transformed non-directionally selected transformed data, the weighting by the respective determined weight factor.

In one version, the weighs for any shifted block is proportional to the number of significant values selected by the selecting in the non-directional selecting transforming, e.g., using thresholding.

One version further includes determining edge features. The combining includes combining the edge features, the formed combination data and the denoised image data according to the one or more criteria.

Particular embodiments include an apparatus comprising a horizontal directionally selecting forward transformer operating on shifted overlapped versions of a block of image data. The horizontal directionally selecting forward transformer implementing a forward horizontally selecting transform separable to a one-dimensional horizontal forward transform followed by a directional selection operation to select significant ones of the one-dimensionally transformed values, followed by a one-dimensional vertical forward transform. The apparatus further includes a horizontal inverse transformer coupled to the horizontal directionally selecting forward transformer and configured to inverse transform the output of the horizontal directionally selecting forward transformer, and a horizontal combiner coupled to the horizontal inverse transformer and configured to form a combination of the inverse transformed data for the overlapped shifts of a block for horizontal edges.

The apparatus further includes a vertical directionally selecting forward transformer operating on shifted overlapped versions of a block of image data. The vertical directionally selecting forward transformer implementing a forward vertically selecting transform separable to a one-dimensional vertical forward transform followed by a directional selection operation to select significant ones of the one-dimensionally transformed values, followed by a one-dimensional horizontal forward transform. The apparatus further includes a vertical inverse transformer coupled to the vertical directionally selecting forward transformer and configured to inverse transform the output of the vertical directionally selecting forward transformer, and a vertical combiner coupled to the vertical inverse transformer and configured to form a combination of the inverse transformed data for the overlapped shifts of a block for vertical edges. The apparatus further includes a denoising filter configured to contribute to denoising image data; and a local adaptation subsystem coupled to the denoising filter and to the vertical and horizontal combiners configured to switch between a deblocking mode and denoising mode according to the location of the pixel, so that deblocking occurs for pixels in block edge regions.

In one version, the denoising filter includes a non-directional selecting forward transformer operating on shifted overlapped versions of a block of image data. The non-directional selecting forward transformer implementing a forward transform separable and a non-directional selection operation to select significant ones of the transformed values. The denoising filter further includes a non-directional inverse transformer coupled to the non-directional selecting forward transformer and configured to inverse transform the output of the non-directional selecting forward transformer; and a non-directional combiner coupled to the non-directional inverse transformer and configured to form a weighted combination of the inverse transformed data for the overlapped shifts.

One version of the apparatus further includes an edge detector/classifier configured to detect edges in the block of image data, and to provide a classification to a pixel as to whether it is an edge feature, a block edge, or neither a block edge or an edge feature, the edge detector/classifier having output coupled to the local adaptation subsystem.

Particular embodiments include a computer readable medium having instructions coded thereon that when executed by one or more processors of a processing system carry out a method of reducing blocking artifacts and/or noise in an image that has been compressed by a block-based encoding process. The method includes deblocking an image using overlapped forward directional transforms. The overlapped forward directional transforms include directional thresholding to filter across horizontal and vertical boundaries. The method further includes denoising using overlapped forward non-directional transforms, with the overlapped forward non-directional transforms including non-directional thresholding. The method also includes edge detecting to classify individual pixels as to whether or not they belong to edge features, and generating output pixels by locally adapting to whether the pixels are in block boundaries, and/or include edge features. The edge detecting uses the overlapped forward transforms.

Particular embodiments include a computer readable medium having instructions coded thereon that when executed by one or more processors of a processing system carry out a method of reducing blocking artifacts and/or noise in an image that has been compressed by a block-based encoding process. The method includes for a block of image data, repeating for different horizontal and vertical shifts (including no shifts) selecting a block of image data according to the shift, and directionally forward transforming the block by a forward horizontally selecting transform and by a forward vertically selecting transform. The forward horizontally selecting transform is separable to a one-dimensional horizontal forward transform followed by a directional selection operation, e.g., thresholding to select significant ones of the one-dimensionally transformed values, followed by a one-dimensional vertical forward transform. Similarly, the forward vertically selecting transform is separable to a one-dimensional vertical forward transform followed by a directional selection operation, e.g., thresholding to select significant ones of the one-dimensionally transformed values, followed by a one-dimensional horizontal forward transform. The method further includes inverse transforming the horizontally selected transformed data and the vertically selected transformed data, and forming a combination of the inverse transformed horizontally selected transformed data and the inverse transformed vertically selected transformed data for the different shifts. The method further includes filtering the block of image data to form a block of denoised image data; and, for each pixel location in the block of image data, combining the formed combination data and the denoised image data according to one or more criteria.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Known Deblocking Methods and Known Denoising Methods

Many denoising and deblocking methods are known in the art. A. Nosratinia in "Denoising JPEG images by re-application of JPEG," 1998 IEEE Second Workshop on Multimedia Signal Processing, 7-9 Dec. 1998 Page(s): 611-615 (hereafter Nosratinia) describes, for still pictures, re-applying JPEG encoding for the purpose of deblocking JPEG compressed images in which blocking artifacts occur as a result of the separate encoding of 8×8 blocks in standard JPEG. Nosratinia re-applies JPEG encoding using blocks that are overlapping. The method therefore includes encoding, then decoding, and then re-encoding. The overlapped blocks are averaged to obtain the final result, in which the visibility of boundaries between blocks is eliminated or at least reduced.

Note that Nosratinia's method is applied to all pixels even though blocking is noticeable only along the boundaries. The ability of a method to be applied only to some local regions is called local adaptivity herein. Nosratinia's method lacks local adaptivity. Furthermore, Nosratinia's method includes quantization and inverse quantization per the JPEG standard. JPEG encoding includes breaking up an image into blocks, applying discrete cosine transform (DCT) to each block, and quantizing the coefficients, e.g., to force small coefficients values to 0 (JPEG also includes ordering the quantized coefficients, and encoding the ordered quantized coefficients). In Nosratinia's method, the non-zero-valued quantized DCT coefficients undergo another quantization process, leading to further distortion. Quantization followed by inverse quantization in an example of a selection process to select significant valued ones of the coefficients. Thresholding is another selecting process and avoids the distortion produced by multiple quantization, reconstruction, and re-quantization. Also, because the quantization methods in Nosratinia are JPEG quantization operations, these operations are not directional, while blocking artifacts are generally more pronounced in the horizontal and vertical directions. JPEG quantization is not tailored specifically to address horizontal and vertical blocking artifacts specifically. Some embodiments of the present invention include using an approach, e.g., directional thresholding. Furthermore, because Nosratinia's method includes decoding and re-encoding, the method requires knowledge of what quantization parameter was used the JPEG encoding. While knowing the quantization parameters can offer advantage, the quantization parameter may not always be known, so that a desirable property of a method is not requiring knowledge of the quantization parameter(s) used in encoding. Furthermore, Nosratinia's method does take into account important image features, such as image edges.

One interpretation of Nosratinia's method is that it is essentially using a denoising filter for deblocking, since there is no local adaptivity or quantization/thresholding operations specifically targeted at removing horizontal and vertical edges that are present in blocky video.

Nosratinia's technique was extended by Samadini et al. in R. Samadani, A. Sundararajan, and A. Said: "Deringing and deblocking DCT compression artifacts with efficient shifted transforms," 2004 International Conference on Image Processing, 2004 (ICIP '04), Volume 3, 24-27 Oct. 2004, Page(s): 1799-1802. Amongst other improvements, Samadini et al. used computationally simpler transforms than the DCTs used by JPEG/MPEG and furthermore includes weighting of the shifted transforms.

A method for denoising video that uses an approach similar Nosratinia still image deblocking method is described by Rusanovsky et al. in D. Rusanovskyy and K. Egiazarian: "Video Denoising Algorithm in Sliding 3D DCT domain," Institute of Signal Processing, Tempere University of Technology, Finland, 2005. As in Nosratinia's approach, Rusanovskyy et al. uses an average of overlapped transforms. Unlike Nosratinia that includes an entire encoding/decoding chain of transforming, quantization, inverse quantization, and inverse transforming that takes uses JPEG (and can similarly be applied to MPEG), Rusanovskyy et al. describes a thresholding process performed in the transform domain, avoiding the quantization and inverse quantization operations and resulting artifacts produced by Nosratinia. Rusanovsky et al. also describes using of 3D DCTs adding the temporal dimension to the 2D spatial dimensions. Non-uniform weighting is applied to produce the average of the thresholded images.

The denoising filter of Rusanovskyy et al. is called a sliding window DCT (SWDCT) filter. FIG. 1 shows a simplified block diagram of an embodiment of a SWDCT denoising filter. Denote by P an input picture of size m×n. Suppose the image is broken up into 8×8 blocks. Denote by (i,j) the location of an 8×8 block of pixels in the picture P. In one implementation of a SWDCT, the 8×8 blocks of pixels are first transformed with a discrete Cosine transformer (DCT) 103. A DCT thresholder 105 is configured to only consider DCT coefficients that are above a pre-selected threshold. In practice, this essentially eliminates the higher frequency coefficients, and therefore also noise. An inverse DCT transformer 107 generates pixels for the block with the high frequencies eliminated. A weight calculator 109 is configured to calculate a weight for each thresholded DCT from the thresholder 105, and a multiplier 111 is configured to multiply the inverse DCT'd values by the calculated weight factor. The result is accumulated in an accumulation buffer 113. This process is repeated for shifted versions of the picture P from 4 pixels to the left to 3 pixels to the right, and similarly vertically, e.g., using a controller. Therefore, each pixel will undergo 64 different filtered versions (original plus 7 different shifts horizontally times original plus 7 different shifts vertically) which are accumulated in the accumulation buffer 113. The accumulation buffer will thus contain a weighted average of the sliding thresholded DCTs, inverse transformed to pixels.

Note that FIG. 1 is a simplified block diagram with many details left out in order not to obscure the main features. Therefore, for example, the controller is coupled to more than the block selector 103. Furthermore, one or more of the elements typically may be implemented by execution of instructions that are encoded in a memory and/or other computer readable medium and executed by one or more processors of a processing system.

FIG. 1 shows a serial implementation wherein the transforms are repeated for different shifts and the inverse transformed results are accumulated. A parallel implementation also is possible wherein separate transform units run in parallel for the different shifts, and sums are formed of the inverse transformed of the different shifts, with a weighted sum being formed for the non-directional denoising inverse transformed data.

The methods and apparatuses of carrying out forward transforming for different horizontal and vertical shifts, selecting values, e.g., by quantizing or thresholding, followed by inverse transforming and combining of the results for the different shifts is called overlapped forward transforming.

Note that in both the Nosratinia and Rusanovskyy et al. filters, the sliding transforms that correspond to the (0,0) shifted positions—i.e., zero shift horizontally and zero shift vertically—contribute equally in the deblocking/deblocking process. This is understandable in Rusanovskyy et al. where the only focus is denoising. However, for deblocking, the (0,0) transforms serve to reinforce the pixel values of the input video, thereby preserving the blocking and possibly contributing to increased blocking. In one embodiment of the present invention, as described below, the (0,0) transform is omitted from contributing to the process for deblocking.

The Deblocking and Denoising Filter

Figure 2:
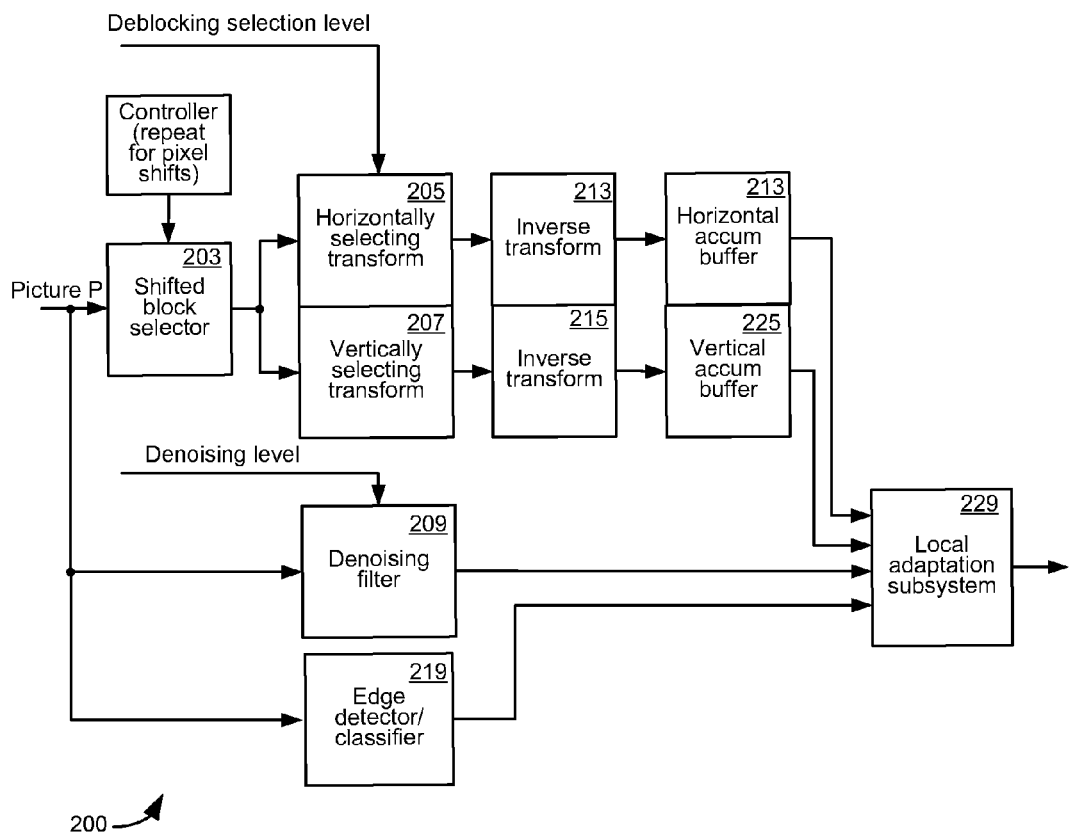
FIG. 2 shows a simplified block diagram of an embodiment of an apparatus that implements an integrated deblocking and denoising filter and that includes one or more features of the present invention.

FIG. 2 shows a simplified block diagram of an embodiment of an apparatus 200 that implements an integrated deblocking and denoising filter. This filter includes a horizontal directionally selecting forward transformer 205 and a vertical directionally selecting forward transformer 207 configured to contribute to deblocking image data in the horizontal and vertical directions, respectively. In one embodiment, the selecting of the transforms is according to a deblocking selection level. The selecting is to select significantly values ones of the transformed values. One example of selecting is thresholding to select only those transformed values that have amplitudes that are above a pre-defined, e.g., a settable value. Other selecting processes also may be used, e.g., quantizing, rounding, and so forth. The general idea is to select transform coefficients that have significant values. The transform in general is a separable threshold that can be partitioned into a one-dimensional transform in one direction, e.g., horizontal or vertical, a selecting process in the one direction, e.g., a thresholding process, and a one dimensional transform in the other direction. The transform transforms to a domain that is or is analogous to spatial frequency. Examples include a discrete cosine transform, a Fourier transform, a Hadamard transform, a Haar transform, an integer transform that approximates a discrete cosine transform, such as the transform used in the H.264/AVC compression method or larger, e.g., 8×8 versions thereof, a wavelet transform, and so forth. See for example, the above-mentioned Samadani et al article "Deringing and deblocking DCT compression artifacts with efficient shifted transforms," for a description of an 8×8 DCT-like integer transform that can be implemented without multiplications.

These transformers 205, 207 are applied to a pixel block extracted by a block extractor 203 that is configured to extract/select a block of pixels, e.g., n×n pixels, where n denotes an integer number, e.g., 8 or 16. The operations on a pixel block are carried for a plurality of overlapping blocks by shifting the position, denoted (i,j) of the block in the horizontal and vertical position, e.g., for an 8×8 block from 4 pixels to the left to 3 pixels to the right, and similarly vertically, e.g., using a controller 231. In general, for an n×n block, one embodiment includes carrying out the operations for n horizontal and n vertical positions for a total of $n^2$ positions in an image denoted P. For decoded images that is decode from a compressed form that was encoded according to a block based encoding method, such as MPEG, JPEG, H.264/AVC, or some other standard or non-standard method, n matches the block sizes, the location of the blocks is configured to correspond to the blocks of the encoding method.

The apparatus includes inverse transformer 213 configured to inverse transform the output of the horizontal directionally selecting forward transformer 205 and a horizontal accumulation buffer 221 configured to accumulate the results of the inverse transformed horizontally selected transformed data for each pixel, so that after the carrying out the operations for shifted blocks, each pixel in the horizontal accumulation buffer 221 contains a value proportional to unweighted average of the inverse transformed horizontally selected transformed data. The buffer acts as a horizontal combiner coupled to the horizontal inverse transformer and configured to form a combination of the inverse transformed data for the overlapped shifts of a block for horizontal edges. The apparatus further includes inverse transformer 215 configured to inverse transform the output of the vertical directionally selecting forward transformer 207 and a vertical accumulation buffer 223 configured to accumulate the results of the inverse transformed vertically selected transformed data for each pixel, so that after the repeating for shifted blocks, each pixel in the vertical accumulation buffer 223 contains a value proportional to unweighted average of the inverse transformed vertically selected transformed data. The buffer acts as a vertical combiner coupled to the vertical inverse transformer and configured to form a combination of the inverse transformed data for the overlapped shifts of a block for horizontal edges.

The apparatus further includes a denoising filter 209 configured to contribute to denoising image data according to a denoising level.

One embodiment further includes an edge detector/classifier 219 to detect edges in the block of image data, to provide a classification to the pixel as to whether it is an edge feature, a block edge, or neither a block edge nor an edge feature. The accumulated outputs and the edge detector/classifier outputs are processed in a local adaptation subsystem 229 to provide edge-specific filtering in order to keep edges sharp. The local adaptation subsystem 229 is configured to switch between a deblocking mode and denoising mode according to the location of the pixel, so that deblocking occurs for pixels in block edge regions. The adaptation subsystem 229 selects the mode according to a mode select input that depends on a pixel position.

FIG. 2 shows a serial implementation wherein the transforms are repeated for different shifts and the inverse transformed results are accumulated. A parallel implementation also is possible wherein separate transform units run in parallel for the different shifts, and sums are formed of the inverse transformed of the different shifts, with a weighted sum being formed for the non-directional denoising inverse transformed data.

Figure 3:
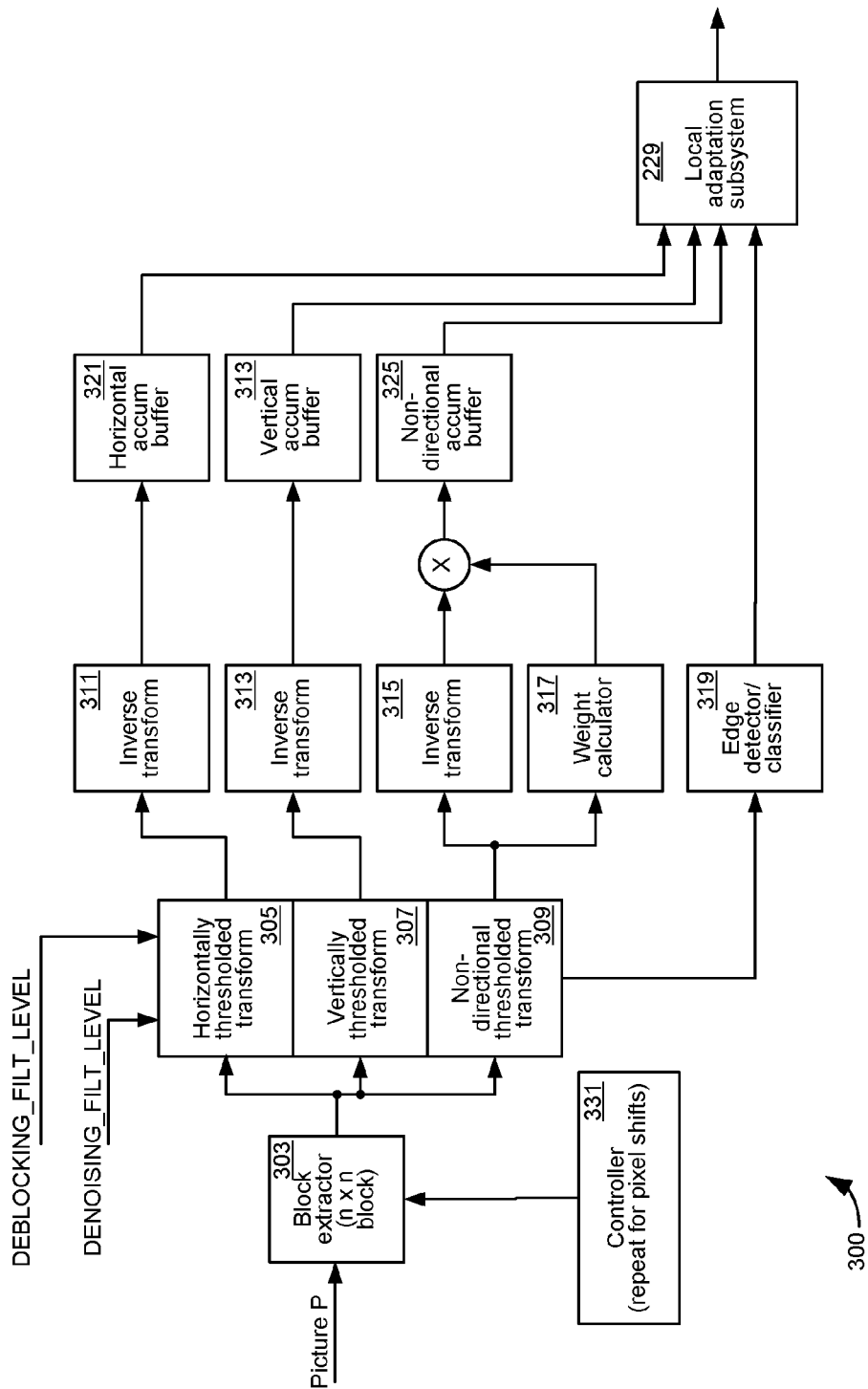
FIG. 3 shows a simplified block diagram of one apparatus embodiment the present invention in the form of an apparatus that implements an integrated deblocking and denoising filter.

FIG. 3 shows a simplified block diagram of one embodiment of an apparatus 300 that implements an integrated deblocking and denoising filter. Apparatus 300 is a particular implementation of the apparatus shown in FIG. 2. This filter includes a vertical directionally thresholded forward transformer 305 and a horizontal directionally thresholded forward transformer 307 configured to contribute to deblocking image data, a non-directionally thresholded forward transformer 309 configured to contribute to denoising image data. These transformers 305, 307, and 309 are applied to a pixel block extracted by a block extractor 303 that is configured to extract/select a block of pixels, e.g., n×n pixels, where n denotes an integer number, e.g., 8 or 16. The operations on a pixel block are repeated for overlapping blocks by shifting the position, denoted (i,j) of the block in the horizontal and vertical position, e.g., for an 8×8 block from 4 pixels to the left to 3 pixels to the right, and similarly vertically, e.g., using a controller 331. In general, for an n×n block, one embodiment includes repeating the operations for n horizontal and n vertical positions for a total of n2 positions in an image denoted P. For decoded images that is decode from a compressed form that was encoded according to a block based encoding method, such as MPEG, JPEG, H.264/AVC, or some other standard or non-standard method, n matches the block sizes, the location of the blocks is configured to correspond to the blocks of the encoding method.

The thresholding in the horizontal thresholded transform 305 and in the vertically thresholded transform 307 is according to a settable thresholding value determined from a quantity shows as DEBLOCKING_FILT_LEVEL. The thresholding in the non-directional thresholded transform 309 is according to a settable thresholding value determined from a quantity shows as DENOISING_FILT_LEVEL.

The transform in general is a separable threshold transform that can be partitioned into a one-dimensional transform in one direction, e.g., horizontal or vertical, a thresholding process, and a one dimensional transform in the other direction. The transform transforms to a domain that is or is analogous to spatial frequency. One embodiment uses a DCT. Other embodiments use other transforms.

In one embodiment, the horizontal or vertical thresholded transform also include non-directional thresholding after the second one dimensional transform in the other direction. That way, the deblocking filters also carry out non-directional denoising.

The apparatus includes inverse transformer 311 configured to inverse transform the output of the horizontal directionally thresholded forward transformer 305 and a horizontal accumulation buffer 321 configured to accumulate the results of the inverse transformed horizontal thresholded transformed data for each pixel, so that after the repeating for shifted blocks, each pixel in the horizontal accumulation buffer 321 contains a value proportional to unweighted average of the inverse transformed horizontal thresholded transformed data. The apparatus further includes inverse transformer 313 configured to inverse transform the output of the vertical directionally thresholded forward transformer 307 and a vertical accumulation buffer 323 configured to accumulate the results of the inverse transformed vertical thresholded transformed data for each pixel, so that after the repeating for shifted blocks, each pixel in the vertical accumulation buffer 323 contains a value proportional to unweighted average of the inverse transformed vertical thresholded transformed data. The apparatus further includes inverse transformer 315 configured to inverse transform the output of the non-directional thresholded forward transformer 309, as well as a weight calculator 317 configured to determine a weight according to the non-directionally transformed data from unit 309 and a weighting unit to weight the inverse transformed data. The apparatus further includes a non-directional accumulation buffer 325, also called the noise accumulation buffer 325 configured to accumulate the results of the weighted inverse transformed non-directionally thresholded transformed data for each pixel, so that after the repeating for shifted blocks, each pixel in the noise accumulation buffer 321 contains a value proportional to the weighted average of the inverse transformed non-directional thresholded transformed data.

One embodiment further includes an edge detector/classifier 319 to detect edged in the block of image data. The edge detector/classifier uses transformed data produced in forward transform unit, so is therefore computationally efficient compared to an edge detector that works directly in the pixel domain. In one embodiment, the output of the edge detector/classification includes a classification of whether or not a pixel is an edge feature, and if not whether it is a block edge.

The accumulated outputs and the edge detector/classifier outputs are processed in a local adaptation subsystem 229 to provide edge-specific filtering in order to keep edges sharp and to allow switching between a deblocking mode and denoising mode according to the location of the pixel, so that deblocking occurs for pixels in block edge regions. The adaptation subsystem 229 selects the mode according to a mode select input that depends on a pixel position.

In one embodiment of the present invention, the (0,0) transform is omitted from contributing to the process for deblocking.

A comparison with the above-mentioned Note that in both the Nosratinia and Rusanovskyy et al. filters is of interest. In both Nosratinia and Rusanovskyy et al., the sliding transforms that correspond to the (0,0) shifted positions—i.e., zero shift horizontally and zero shift vertically—contribute equally in the deblocking/deblocking process. This is understandable in Rusanovskyy et al. where the only focus is denoising. However, for deblocking, the (0,0) transforms serve to reinforce the pixel values of the input video, thereby preserving the blocking and possibly contributing to increased blocking. As stated above, in one embodiment of the present invention, the (0,0) transform is omitted from contributing to the process for deblocking.

FIG. 3 shows a serial implementation wherein the transforms are repeated for different shifts and the inverse transformed results are accumulated. A different embodiment uses a parallel implementation wherein separate transform units run in parallel for the different shifts, and sums are formed of the inverse transformed of the different shifts, with a weighted sum being formed for the non-directional denoising inverse transformed data.

A Method Embodiment

Figure 4:
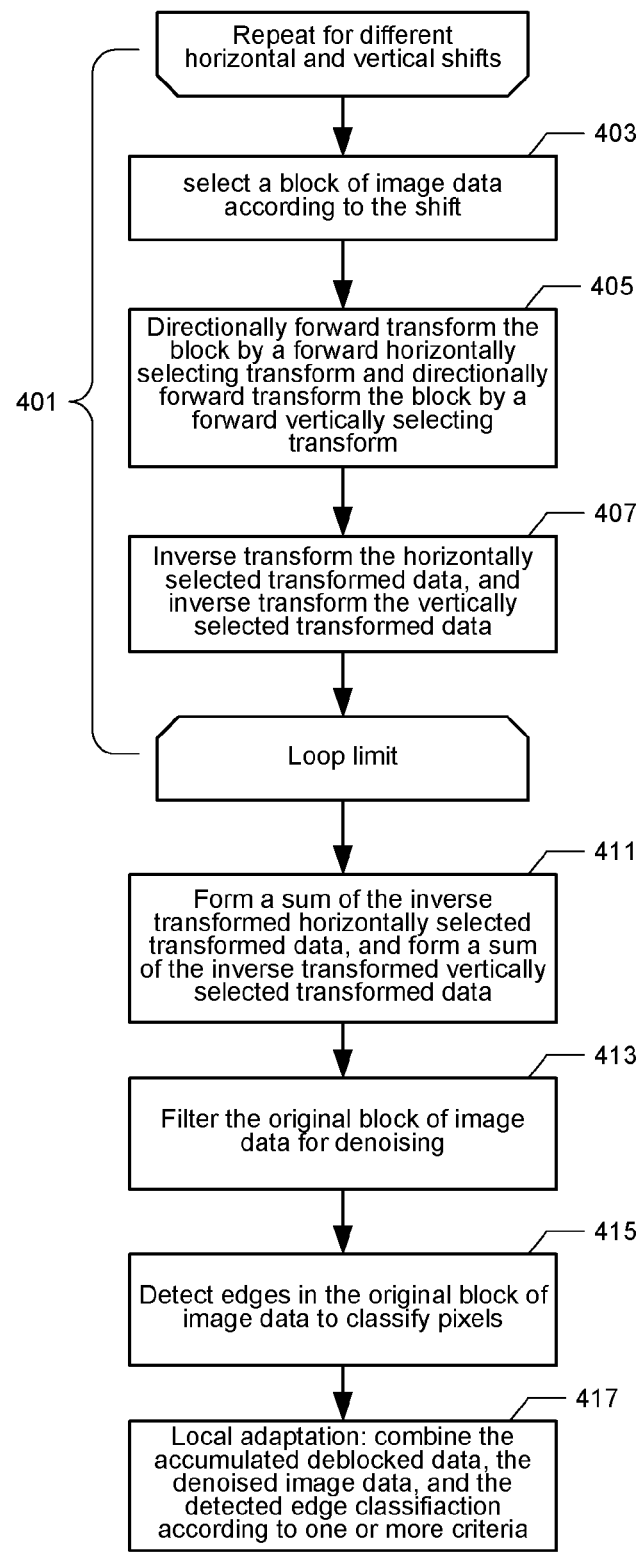
FIG. 4 shows a flowchart of a method embodiment of the invention.

FIG. 4 shows a flowchart of a method embodiment of the invention. The method is for reducing blocking and/or noise in an image, e.g., an image that has been reconstructed from an image compressed by a block-based encoding process. The method includes, for a block of image data, for different horizontal and vertical shifts (including no shift), carrying out the following steps (410): in 403, selecting a block of image data according to the shift, in 405 directionally forward transforming the block by a forward horizontal selective transform to form horizontally selected transformed data and by a forward vertical selective transform to form vertically selected transformed data, and in 407 inverse transforming the horizontally selected transformed data and inverse transforming the vertically selected transformed data. The forward horizontal selective transform are separable to a one-dimensional horizontal forward transform followed by a selection operation such as thresholding to select significant ones of the one-dimensionally transformed values, followed by a one-dimensional vertical forward transform. The forward vertical selective transform is separable to a one-dimensional vertical forward transform followed by a selection operation such as thresholding to select significant ones of the one-dimensionally transformed values, followed by a one-dimensional horizontal forward transform.

The method further includes in 411 forming a sum of the inverse transformed horizontally selected transformed data and the inverse transformed vertically selected transformed data for the different shifts, and 413 filtering the block of image data to form a block of denoised image data, and in 415 for each pixel location in the block of image data, detecting/classifying the image to classify each pixel as to whether it is an edge feature, and if not, whether it is a block edge. Step 417 includes combining the accumulated deblocked data and the denoised image data according to one or more criteria.

A Computer-Readable Medium in an Apparatus

Figure 5:
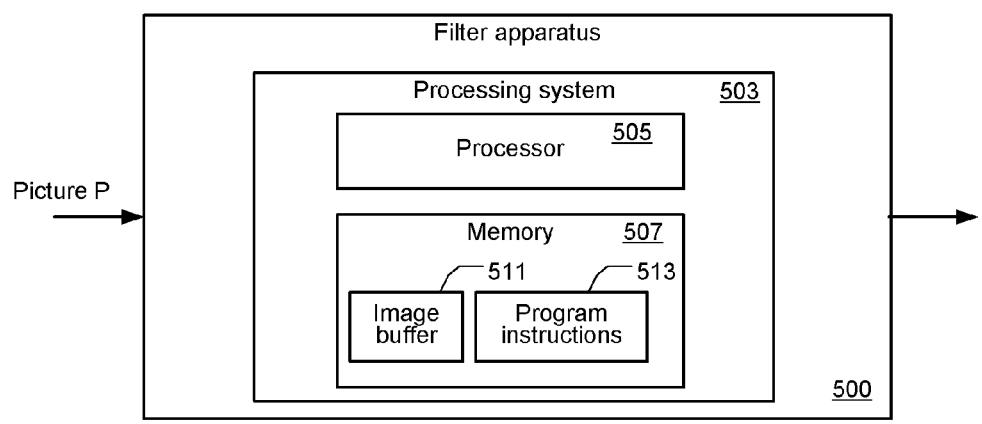
FIG. 5 shows a simplified block diagram of an apparatus embodiment of the invention that includes a processing system, and a computer readable medium embodiment of the invention.

FIG. 5 shows an apparatus embodiment 500 that includes a computer readable medium embodiment of the invention. The apparatus includes a processing system 503 that includes one or more processors. One processor is shown in the embodiment of FIG. 5. The processing system also includes a memory 507. Part of the memory is used to implement one or more buffers, and one image buffer 511 is shown in FIG. 5. The memory 507 also includes program instructions 513 that when executed by the processing system, cause a method of reducing blocking artifacts and/or noise in an image that has been compressed by a block-based encoding process. The method, for example, is as described above and in the flow chart of FIG. 4, and elsewhere herein.

Directionally Selective Transforms for Deblocking

The directional thresholded transforms are configured to carry out deblocking. In one embodiment, the directional thresholded transforms are also configured to carry out denoising, so that for pixels selected by the adaptation subsystem 229 to be deblocked, the pixel values are also denoised.

One embodiment of the invention uses the DCT and inverse DCT (IDCT) as the forward and inverse transforms. The invention, however, is not limited to such transforms, and other transforms can be used. H.264, for example, uses an integer transform. The general property is that the higher frequencies of typical images have many small-valued coefficients, such that either quantizing or thresholding in the sense of selecting only values above an amplitude threshold eliminates higher frequency coefficients that are relatively small values, e.g., smaller than the threshold or than the quantizing interval.

The forward transforms in the deblocking/denoising filter are thresholded by three separate processes. Transforms such as DCT and others can be implemented as a horizontal transform followed by a vertical transform. That is, when transforming an n×n block of image data, represented by an n×n matrix denoted by X to a transformed block denoted by n×n matrix Y, many transforms, including the DCT transform can be expressed as:

$$Y = AXA^T \qquad (1)$$

where X in the input matrix, and A is the matrix of the transformation in one dimension—the horizontal. Superscript T denotes the matrix transpose, so that post-multiplication by $A^T$ is the same as a 1-D transform in the direction orthogonal to that of A, in this case the vertical direction.

Eq. (1) can be written as Y=(A X) A$^T$ to state that X is first transformed horizontally by pre-multiplying the n×n block X by the matrix A and then vertically by post-multiplying the horizontal result by A$^T$. Alternately, Eq. (1) can be written as Y=A (X A$^T$) to state that X is first transformed vertically by post-multiplying X by A$^T$ and then transformed horizontally by pre-multiplying the vertically transformed data A. For horizontal then vertical, let T$_{HX}$=A X so that Y=T$_{HX}$A$^T$.

Then a horizontally thresholded version of Y can be accomplished by thresholding prior to post-multiplying T$_{HX}$ by A$^T$.

A similar result follows for vertically directional thresholding, by setting T$_{VX}$=X A$^T$ so that Y=A T$_{VX}$ and thresholding prior to pre-multiplying T$_{VX}$ by A.

The thresholding of the horizontal thresholding transformer 205 and the vertical thresholding transformer 207 include producing thresholded transformed blocks, Y$_V$ and Y$_H$ from an input pixel block X according to Eqs. (2) and (3), respectively, as follows:

$$Y_H = Th_H(T_{HX})A^T \quad (2)$$

$$Y_V = ATh_V(T_{VX}) \quad (3)$$

where Th$_H$(•) and Th$_V$(•) denote the horizontal and vertical thresholding operations, respectively. These operations are selected to achieve horizontal and vertical deblocking, respectively. That is, the thresholding operations select only coefficients that are have amplitudes larger than a predefined threshold values. Smaller coefficients are filtered out.

The invention is not limited to selecting any particular threshold amount. In one embodiment using 8×8 blocks and the DCT, the following consideration is made. A 1D-DCT scales the input by sqrt(8), approximately 2.88. Thus, a pixel block with a maximum DC value of 255 (8-bits) has a maximum of around 721. To filter and leave good visual detail, one embodiment allows a peak signal-noise-ratio (PSNR) of about 36 which leads to a permitted error of 4 (in a scale of 255). When scaled by sqrt(8), this leads to a threshold of 11, to integer precision. Other embodiments use other thresholding values.

Some embodiment of the horizontal thresholding transformer 205 and of the vertical thresholding transformer 207 further includes non-directional denoising. With such transformers, after directionally thresholded operations have been performed as in (2) and (3), the blocks are further thresholded for noise reduction.

$$Y_{NH} = Th_N(Y_H) \quad (4)$$

$$Y_{NV} = Th_N(Y_V), \quad (5)$$

where Th$_N$(•) denoted a non-directional thresholding operation selected to achieve denoising. That is, the thresholding operation selects only coefficients that are have amplitudes larger than a predefined threshold values. Smaller coefficients are filtered out. As described above, each of the directionally thresholded transformed are inverse transformed by inverse transformers 211 and 213, and accumulated in buffers 221 and 223.

The inventors found that for 8×8 blocks, using the DCT, for the non-directional thresholding, a threshold of 4/255 of maximum value, i.e., about 1.45% of maximum value leads to good results.

The Denoising by Non-Directional Thresholded Transform

In addition, non-directional transformer 209 is configured to threshold in a non-directional manner. While one embodiment uses the same transform as the directional transformer 205 and 207, in general, a different transform may be used for the non-directional transformer 209. For a transform that, like the DCT, can be applied in a separable way, e.g., first vertically then horizontally, or vice versa, the transform denoted Y' of an n×n block of image data denoted X can be written as $$Y' = A'XA'^T \quad (6)$$

where A' does not necessarily equal A, but in some embodiment is the same as A.

The thresholding of the non-directional thresholding transformer 209 include producing thresholded transformed block denoted, Y$_N$ as follows:

$$Y_N = Th_N(Y). \quad (7)$$

where Th$_N$(•) denoted a non-directional thresholding operation selected to achieve denoising. In one embodiment, the same denoising threshold operation is used in the non-directional transformer 209 and in the directional transformers 205 and 207.

The inventors found that for 8×8 blocks, using the DCT, for the non-directional thresholding, a threshold of 4/255 of maximum value, i.e., about 1.45% of maximum value leads to good results.

As described above, the non-directional thresholded transformed data is weighted for different shifts.

At each pixel, the horizontal accumulation buffer 221 represents a horizontally filtered and noise filtered pixel and the vertical accumulation buffer 223 represents a vertically filtered and noise filtered pixel. The non-directional accumulation buffer (also called the noise accumulation buffer) 225 represents a noise filtered only pixel.

Each of these buffers is input to the local adaptation subsystem 229.

Edge Detection/Classification Using Overlapped Transforms and Variance Map.

One embodiment of the invention further includes edge detection/classification to preserve at least some of the edge visibility in the image.

Many methods of edge detection in images are known. They range from simple variance based edge detection such as that described in Yao Nie; Hao-Song Kong; Vetro, A.; Huifang Sun; Barner, K. E.: "Fast adaptive fuzzy post-filtering for coding artifacts removal in interlaced video," IEEE International Conference on Acoustics, Speech, and Signal Processing, 2005 (ICASSP '05), Volume 2, 18-23 Mar. 2005, Page(s): ii/993-ii/996 to more sophisticated methods such as the Canny edge detector described in Canny, J. F: A computational approach to edge detection." IEEE Trans Pattern Analysis and Machine Intelligence, Vol. 8, No. 6, Pages: 679-698, November 1986.

One embodiment of the invention uses an edge detector/classifier that combines variance based edge detection with transform-based edge detection, using the transform results from the transformers used for the deblocking and/or denoising. The result is a simple but reliable edge detector.

It is known that the Sobel edge detection operator can be approximated from the output of the DCT. See for example Chung-Bin Wu; Bin-Da Liu; Jar-Ferr Yang: "Adaptive post-processors with DCT-based block classifications," IEEE Transactions on Circuits and Systems for Video Technology, Volume 13, Issue 5, May 2003, Page(s): 365-375. In this Wu et al. paper, edge detection is application for deblocking within a decoding process. The DCT-based edge detection is used to find horizontal or vertical edges along the blocks. This however is different from the application described herein.

The Wu et al method however has useful methods for the present deblocking/denoising application.

In one embodiment, the gradients in the horizontal x and vertical y directions can be approximated by.

$$Gx\sim = 2.88F(0,1) + F(0,3)$$

$$Gy\sim = 2.88F(1,0) + F(3,0)$$

where $F(\bullet,\bullet)$ denoted the DCT of an 8×8 block of image data.

One example of edge detection is similar to that proposed in the above-mentioned Chung-Bin Wu et al. paper, and includes thresholding the sum of the gradients in the x and y directions:

$$E(i,j) = \text{Edge if } abs(Gx) + abs(Gy) > Th \quad (6)$$

where Th denoted a settable threshold, and (ij) denote the location of the block of image data on which the DCT is used. Thus, $E(i,j)$ is for an 8×8 block. Thus, a block is said to be an edge feature block when $E(i,j)$ has detected an edge.

In the combined deblocking/denoising filter, the edge detector/classifier includes the following capabilities:

For every pixel, the edge detector/classifier generates an indication of whether or not the pixel is an edge feature, and thus should be preserved. An edge feature is unlikely to be an artifact.

For every pixel, the edge detector/classifier generates an indication of whether the pixel is a potential horizontal edge or vertical edge which is a potential blocking artifact.

To accomplish this, the edge detector/classifier is configured to compute the local variance of each pixel, and accumulate the DCT based edge detection of Eq. (6) at each pixel. For every pixel, a feature edge is declared if the local variance exceeds an edge feature variance threshold, and if the number detected edge feature blocks exceeds an edge feature number threshold. That is, a pixel location (i,j) is classified as an edge feature pixel is $$V(i,j) > Th\_Var\_\text{edge, and} \quad (7b)$$

$$N\_DCT\_EDGE(i,j) > TDCT\_\text{Edge,} \quad (7a)$$

where $V(i,j)$ denoted the local variance at pixel (i,j) in the picture. $N\_DCT\_EDGE(i,j)$ is the number of sliding window DCTs at pixel (i,j) have detected a feature edge according to Eq. (6) that uses the DCT to ascertain a block at (i,j) being a feature edge. $Th\_Var\_edge$ is the settable edge feature variance threshold, and $TDCT\_Edge$ is the settable edge feature number threshold. In one embodiment, the local variance is computed in a small square window around a pixel, e.g., a 3×3 window. For 8×8 blocks, one example of a suitable edge feature variance threshold is Th_Var_Edge=40 and one example of an edge feature number threshold is TDCT_Edge=30. Note that using an apparatus such as shown in FIG. 3 with 8×8 bocks, and using a sliding DCT, that is, forward filtering with 8 different shift values in each direction (including no shift), there are 64 sliding window DCTs making up the accumulated buffers at each pixel.

Comparison with the Wu et. al. method is worthy of note. In Wu et. al., the edge detection results per pixel are aggregated as the transforms (e.g. DCT's) slide over the image. Wu et al relies on the result of one DCT and therefore all detections apply to entire blocks. This is not necessarily the case in embodiments of the present invention.

For every pixel that is not classified as a feature edge, in one embodiment, such a non-feature edge pixel is classified as a block edge feature if the pixel if the local variance exceeds an block edge variance threshold, and if the number detected edge feature blocks exceeds an block edge number threshold.

That is, if:

$$V(i,j) > Th\_\text{Block\_edge, and} \quad (8a)$$

$$N\_DCT\_EDGE(i,j) > TDCT\_\text{Block Edge,} \quad (8b)$$

where Th_Block_edge is the settable block edge variance threshold, and TDCT_Block Edge is the settable block edge number threshold. If Eqs. (8a) and (8b) hold, the pixel is further classified as a horizontal or vertical blocking edge if it is along a block boundary and there are at least a number, denoted k of neighboring pixels along the boundary of the same block also classified as such. An example value of k is k=2.

After the application of Conditions (7a), (7b), (8a), and (8b), the edge detector/classifier classifies each pixel in the picture into one of the following five possible classifications:
  (i) No edge.
  (ii) Feature edge.
  (iii) Horizontal blocking edge.
  (iv) Vertical blocking edge.
  (v) Both vertical/horizontal blocking edge.

Denoting the original picture prior to filtering by Po(i,j), and the edge detector/classifier output as class(Po(i,j)), the possible outputs are:

class(Po(i,j))=no edge, class(Po(i,j))=feature edge, class(Po(i,j))=vertical_blocking_edge, class(Po(i,j))=horizontal_blocking_edge, or class(Po(i,j))=horizontal_vertical_blocking_edge.

The output of the edge detector for each pixel is a classification which is input to the local adaptation function described next.

Local Adaptation

The local adaptation subsystem 229 is operative to combine the accumulated deblocked data, the denoised image data, and the detected edge classification according to one or more criteria. Local adaptation for example determines what kind of filtering is performed by the apparatus 200 (Or 300): deblocking, denoising, or both deblocking and denoising. The apparatus is capable of performed many combinations of such filtering. In one version, the apparatus is operative to work in one of two modes, deblocking and denoising, or denoising only, such nodes denoted DEBLOCKING_DENOISING_MODE and DENOISING_MODE, respectively, where each of DEBLOCKING_DENOISING_MODE and DENOISING_MODE are binary values quantities. When switched into DEBLOCKING_DENOISING_MODE=1, the output from the horizontal or vertical accumulated buffer is selected according to whether the pixel is on a block boundary. If the pixel is in a corner (both horizontal and vertical boundary), then the noise accumulated buffer is selected for that pixel. In DENOISING_MODE=1, only the noise accumulated buffer is selected.

In DEBLOCKING_DENOISING_MODE, the final filtered pixel at location (i,j) is given by:

$$Pf(i,j) = \alpha Po(i,j) + (1-\alpha) Ps(i,j) \quad (9)$$

where Ps(i,j) denotes the pixel from the selected accumulated buffer as described hereinabove, Po(i,j) denotes the original unfiltered pixel in an input picture P(i,j), Pf(i,j) denoted the final filtered pixel, and α is a weighting factor, expressed as a value between 0 and 1.

In one embodiment, in DEBLOCKING_DENOISING_MODE, the weighting factor α is determined as follows:
  a) DEBLOCKING_DENOISING_MODE and DENOISING_FILT_LEVEL=0
    α=0:
    class(Po(i,j))=feature edge.

OR.
class(Po(i,j))=no edge.
  OR.
Po(i,j) is not on block boundary.
α=α_default, a predefined default value:
class(Po(i,j))=vertical_blocking_edge.
  OR.
class(Po(i,j))=horizontal_blocking_edge.
  OR.
class(Po)=horizontal_vertical_blocking_edge.
  AND.
Po(i,j) is on block boundary.
where class(•) denotes the output of the edge detection/classifier function as described hereinabove, and
  b) DEBLOCKING_DENOISING_MODE and DENOISING_FILT_LEVEL not equal to 0
α=0:
class(Po)=feature edge.
α=α_default, the predefined default value:
class(Po)=otherwise.
where class( ) is the output of the edge detection function specified hereinabove.

In DENOISING_MODE, the weighting factor α. is determined as follows:
α=0:
class(Po)=feature edge.
α=α_default, the predefined default value:
otherwise.
where in one example, α_default=1.0

Thus, a combined deblocking/denoising filter apparatus, and a method of deblocking and denoising have been described and applicable to still images and to digital video, in particular to images that are decoded from data encoded by a block based, e.g., block based, transform based image coding method. Some embodiments include the following features:

Horizontal and vertical filtering via directionally thresholded overlapped transforms.
Edge detection using combined overlapped transforms and local variance with pixel classification for deblocking and denoising.
Local adaptation for deblocking and/or denoising according to the type of pixel.

General

In one embodiment, a computer readable medium is encoded with instructions that when executed by one or more processors of a processing system, e.g., in a filter apparatus such as shown in FIG. 5, cause the apparatus to carry out any of the methods described herein.

One embodiment is in the form of logic encoded in one or more tangible media for execution and when executed operable to carry out any of the methods describe herein. One embodiment is in the form of software encoded in one or more computer-readable media and when executed operable to carry out any of the methods described herein.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable tangible media in which are encoded a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a medium in which are encoded a set of instructions, e.g., a computer program that are for execution on one or more processors, e.g., one or more processors that are part of an encoding system. Thus, as will be appreciated by those skilled in the art, embodiments of the present invention may be embodied as a method, an apparatus such as a special purpose apparatus, an apparatus such as a data processing system, or a medium, e.g., a computer program product. The computer-readable medium carries logic including a set of instructions that when executed on one or more processors cause the apparatus that includes the processor or processors to implement a method. Accordingly, aspects of the present invention may take the form of a method, an entirely hardware embodiment, an entirely software embodiment or an embodiment combining software and hardware aspects. Furthermore, the present invention may take the form of medium (e.g., a computer program product on a computer-readable storage medium) carrying computer-readable program code embodied in the medium.

While a medium is shown in an example embodiment to be a single medium, the term "medium" should be taken to include a single medium or multiple media (e.g., a centralized or distributed database, and/or associated caches and servers) that store the one or more sets of instructions. The term "medium" shall also be taken to include any medium that is capable of storing, encoding a set of instructions for execution by one or more of the processors and that cause the one or more processors to perform any one or more of the methodologies of the present invention. A medium may take many forms, including tangible storage media. Non-volatile media includes, for example, optical, magnetic disks, and magneto-optical disks. Volatile media includes dynamic memory, such as main memory. For example, the term "medium" shall accordingly be taken to include, but not be limited to, solid-state memories, a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

It should further be appreciated that although the invention has been described in the context of data that is decided from data coded by a compression method that uses the DCT, e.g., MPEG-2, the invention is not limited to such contexts and may be used in various other applications and systems, for example in a system that uses H.264/AVC, or other compressed media streams, whether conforming to a published standard or not. Furthermore, the invention is not limited to any one type of network architecture and method of encapsulation, and thus may be used in conjunction with one or a combination of other network architectures/protocols.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression "a device comprising A and B" should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still cooperate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of reducing blocking artifacts in an image that has been compressed by a block-based encoding process, the method comprising:
    for a block of image data, for different horizontal and vertical shifts, including no shift in one or both directions:
        selecting a block of image data according to the shift,
        directionally forward transforming the block by a forward horizontally selecting transform to form horizontally selected transformed data and by a forward vertically selecting transform to form vertically selected transformed data, the forward horizontally selecting transform being separable to a one-dimensional horizontal forward transform followed by a directional selection operation to select significant ones of the one-dimensionally transformed values, followed by a one-dimensional vertical forward transform, the forward vertically selecting transform being separable to a one-dimensional vertical forward transform followed by a directional selection operation to select significant ones of the one-dimensionally transformed values, followed by a one-dimensional horizontal forward transform; and
        inverse transforming the horizontally selected transformed data and inverse transforming the vertically selected transformed data;
    forming a combination of the inverse transformed horizontally selected transformed data and the inverse transformed vertically selected transformed data for the different shifts;
    filtering the block of image data to form a block of denoised image data; and
    for each pixel location in the block of image data, combining the formed combination data and the denoised image data according to one or more criteria.

2. A method as recited in claim 1, wherein the filtering the block of image data to form a block of denoised image data includes:
    for each location of the block of image data, repeating for different horizontal and vertical shifts, including no shift:
        forward transforming the block by a forward non-directional selective transform to form non-directionally selected transformed data, wherein the non-directional selective transform includes a non-directional selection operation to select significant ones of the transformed values;
        inverse transforming the non-directionally selected transformed data; and
        determining a weight factor for the non-directionally selected transformed data; and
    forming a weighted combination of inverse transformed non-directionally selected transformed data, the weighting by the respective determined weight factor.

3. A method as recited in claim 2, wherein each directional selection operation includes thresholding to select values that have amplitude above a settable directional threshold value, and wherein the non-directional selection operation includes thresholding to select values that have amplitude above a settable non-directional threshold value.

4. A method as recited in claim 1, further comprising detecting edges to determine if each pixel is an edge feature, a block edge, or a non edge feature non block edge pixel,
    wherein the combining includes combining the formed combination data and the denoised image data according the whether the data is for a pixel classified as an edge feature, a block edge, or a non edge feature non block edge pixel.

5. A method as recited in claim 4, wherein the edge detecting for a pixel location uses gradient information obtained from forward transformed data and calculated local variance for the pixel location.

6. A method as recited in claim 1, wherein the forward horizontally selecting transform includes a non-directional selection operation after the one-dimensional vertical forward transform, and the forward vertically selecting transform includes a non-directional selection operation after the one-dimensional horizontal forward transform, such that the vertically selected transformed data and the horizontally selected transformed data include denoising.

7. A method as recited in claim 1, wherein each selection operation includes thresholding to select values that have amplitude above a settable value.

8. A method as recited in claim 1,
    wherein the forward horizontally selecting transform is separable to a one-dimensional discrete cosine transform in the horizontal direction followed by a directional selection operation, followed by a one-dimensional discrete cosine transform in the vertical direction, and
    wherein the forward vertically selecting transform is separable to a one-dimensional discrete cosine transform in the vertical direction followed by a directional selection operation, followed by a one-dimensional discrete cosine transform in the horizontal direction.

9. A method as recited in claim 1,
    wherein each one dimensional transform in the forward horizontally selecting transform and the forward vertically selecting transform is one of the set of transforms consisting of an integer discrete cosine-like transform, a Haar transform, a Fourier transform, and a wavelet transform.

10. A computer readable medium having instructions coded thereon that when executed by one or more processors of a processing system carry out a method of reducing blocking artifacts in an image that has been compressed by a block-based encoding process, the method comprising:
  for a block of image data, for different horizontal and vertical shifts, including no shift in one or both directions:
    selecting a block of image data according to the shift,
    directionally forward transforming the block by a forward horizontally selecting transform to form horizontally selected transformed data and by a forward vertically selecting transform to form vertically selected transformed data, the forward horizontally selecting transform being separable to a one-dimensional horizontal forward transform followed by a directional selection operation to select significant ones of the one-dimensionally transformed values, followed by a one-dimensional vertical forward transform, the forward vertically selecting transform being separable to a one-dimensional vertical forward transform followed by a directional selection operation to select significant ones of the one-dimensionally transformed values, followed by a one-dimensional horizontal forward transform; and
    inverse transforming the horizontally selected transformed data and inverse transforming the vertically selected transformed data;
  forming a combination of the inverse transformed horizontally selected transformed data and the inverse transformed vertically selected transformed data for the different shifts;
  filtering the block of image data to form a block of denoised image data; and
  for each pixel location in the block of image data, combining the formed combination data and the denoised image data according to one or more criteria.

11. A computer readable medium as recited in claim 10, wherein the filtering the block of image data to form a block of denoised image data includes:
  for each location of the block of image data, repeating for different horizontal and vertical shifts, including no shift:
    forward transforming the block by a forward non-directional selective transform to form non-directionally selected transformed data, wherein the non-directional selective transform includes a non-directional selection operation to select significant ones of the transformed values;
    inverse transforming the non-directionally selected transformed data; and
    determining a weight factor for the non-directionally selected transformed data; and
  forming a weighted combination of inverse transformed non-directionally selected transformed data, the weighting by the respective determined weight factor.

12. A computer readable medium as recited in claim 11, wherein each directional selection operation includes thresholding to select values that have amplitude above a settable directional threshold value, and wherein the non-directional selection operation includes thresholding to select values that have amplitude above a settable non-directional threshold value.

13. A computer readable medium as recited in claim 10, wherein the method further comprises detecting edges to determine if each pixel is an edge feature, a block edge, or a non edge feature non block edge pixel, and wherein the combining includes combining the formed combination data and the denoised image data according to the whether the data is for a pixel classified as an edge feature, a block edge, or a non edge feature non block edge pixel.

14. A computer readable medium as recited in claim 10, wherein the edge detecting for a pixel location uses gradient information obtained from forward transformed data and calculated local variance for the pixel location.

15. A computer readable medium as recited in claim 10, wherein the forward horizontally selecting transform includes a non-directional selection operation after the one-dimensional vertical forward transform, and the forward vertically selecting transform includes a non-directional selection operation after the one-dimensional horizontal forward transform, such that the vertically selected transformed data and the horizontally selected transformed data include denoising.

16. A computer readable medium as recited in claim 10, wherein each selection operation includes thresholding to select values that have amplitude above a settable value.

17. A computer readable medium as recited in claim 10, wherein the forward horizontally selecting transform is separable to a one-dimensional discrete cosine transform in the horizontal direction followed by a directional selection operation, followed by a one-dimensional discrete cosine transform in the vertical direction, and wherein the forward vertically selecting transform is separable to a one-dimensional discrete cosine transform in the vertical direction followed by a directional selection operation, followed by a one-dimensional discrete cosine transform in the horizontal direction, and wherein.

18. A computer readable medium as recited in claim 10, wherein each one dimensional transform in the forward horizontally selecting transform and the forward vertically selecting transform is one of the set of transforms consisting of an integer discrete cosine-like transform, a Haar transform, a Fourier transform, and a wavelet transform.

19. An apparatus comprising:
  a horizontal directionally selecting forward transformer operating on shifted overlapped versions of a block of image data, the horizontal directionally selecting forward transformer implementing a forward horizontally selecting transform separable to a one-dimensional horizontal forward transform followed by a directional selection operation to select significant ones of the one-dimensionally transformed values, followed by a one-dimensional vertical forward transform;
  a horizontal inverse transformer coupled to the horizontal directionally selecting forward transformer and configured to inverse transform the output of the horizontal directionally selecting forward transformer;
  a horizontal combiner coupled to the horizontal inverse transformer and configured to form a combination of the inverse transformed data for the overlapped shifts of a block for horizontal edges;
  a vertical directionally selecting forward transformer operating on shifted overlapped versions of a block of image data, the vertical directionally selecting forward transformer implementing a forward vertically selecting transform separable to a one-dimensional vertical forward transform followed by a directional selection operation to select significant ones of the one-dimensionally transformed values, followed by a one-dimensional horizontal forward transform;

a vertical inverse transformer coupled to the vertical directionally selecting forward transformer and configured to inverse transform the output of the vertical directionally selecting forward transformer;

a vertical combiner coupled to the vertical inverse transformer and configured to form a combination of the inverse transformed data for the overlapped shifts of a block for vertical edges;

a denoising filter configured to contribute to denoising image data; and a local adaptation subsystem coupled to the denoising filter and to the vertical and horizontal combiners configured to switch between a deblocking mode and denoising mode according to the location of the pixel, so that deblocking occurs for pixels in block edge regions.

20. An apparatus as recited in claim 19, wherein the denoising filter comprises:

a non-directional selecting forward transformer operating on shifted overlapped versions of a block of image data, the non-directional selecting forward transformer implementing a forward transform separable and a non-directional selection operation to select significant ones of the transformed values;

a non-directional inverse transformer coupled to the non-directional selecting forward transformer and configured to inverse transform the output of the non-directional selecting forward transformer;

a non-directional combiner coupled to the non-directional inverse transformer and configured to form a weighted combination of the inverse transformed data for the overlapped shifts.

21. An apparatus as recited in claim 20, wherein each directional selection operation includes thresholding to select values that have amplitude above a settable directional threshold value, and wherein the non-directional selection operation includes thresholding to select values that have amplitude above a settable non-directional threshold value.

22. An apparatus as recited in claim 19, further comprising an edge detector/classifier configured to detect edges in the block of image data, and to provide a classification to a pixel as to whether it is an edge feature, a block edge, or neither a block edge or an edge feature, the edge detector/classifier having output coupled to the local adaptation subsystem.

23. An apparatus as recited in claim 22, wherein the edge detector/classifier for a pixel location uses gradient information obtained from forward transformed data and calculated local variance for the pixel location.

24. An apparatus as recited in claim 19, wherein the forward horizontally selecting transform includes a non-directional selection operation after the one-dimensional vertical forward transform, and the forward vertically selecting transform includes a non-directional selection operation after the one-dimensional horizontal forward transform, such that the vertically selected transformed data and the horizontally selected transformed data include denoising.

25. An apparatus as recited in claim 19, wherein the forward horizontally selecting transform is separable to a one-dimensional discrete cosine transform in the horizontal direction followed by a directional selection operation, followed by a one-dimensional discrete cosine transform in the vertical direction, and wherein the forward vertically selecting transform is separable to a one-dimensional discrete cosine transform in the vertical direction followed by a directional selection operation, followed by a one-dimensional discrete cosine transform in the horizontal direction.

26. An apparatus as recited in claim 19, wherein each one dimensional transform in the forward horizontally selecting transform and the forward vertically selecting transform is one of the set of transforms consisting of an integer discrete cosine-like transform, a Haar transform, a Fourier transform, and a wavelet transform.

* * * * *